United States Patent [19]

Hall

[11] 4,442,488
[45] Apr. 10, 1984

[54] INSTRUCTION CACHE MEMORY SYSTEM

[75] Inventor: William E. Hall, Portland, Oreg.

[73] Assignee: Floating Point Systems, Inc., Beaverton, Ohio

[21] Appl. No.: 468,506

[22] Filed: Feb. 22, 1983

Related U.S. Application Data

[63] Continuation of Ser. No. 146,674, May 5, 1980, abandoned.

[51] Int. Cl.³ .................... G06F 9/00; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,337,851 | 8/1967 | Dahm | 364/200 |
| 3,636,519 | 1/1972 | Heath | 364/200 |
| 3,725,876 | 4/1973 | Hauck | 364/200 |
| 3,839,704 | 10/1974 | Spencer | 364/200 |
| 3,868,644 | 2/1975 | Healey et al. | 364/200 |
| 3,938,097 | 2/1976 | Niguette | 364/200 |
| 4,047,243 | 9/1977 | Dijkstra | 364/200 |
| 4,212,058 | 7/1980 | Gunawardena et al. | 364/200 |

Primary Examiner—Harvey E. Springborn
Attorney, Agent, or Firm—Klarquist, Sparkman, Campbell, Leigh, Whinston & Dellett

[57] ABSTRACT

A memory system includes a high-speed, multi-region instruction cache, each region of which stores a variable number of instructions received from a main data memory said instructions forming part of a program. An instruction is transferred to a region from the main data memory in response to a program address and may be executed without waiting for simultaneous transfer of a large block or number of instructions. Meanwhile, instructions at consecutively subsequent addresses in the main data memory are transferred to the same region for building an expanding cache of rapidly accessible instructions. The expansion of a given region is brought about as a result of the addressing of that region, such that a cache region receiving a main line of the aforementioned program will be expanded in preference to a region receiving an occasionally used sub-routine. When a new program address is presented, a simultaneous comparison is made with pointers which are provided to be indicative of addresses of instructions currently stored in the various cache regions, and stored information is gated from a region which produces a favorable comparison. When a new address is presented to which no cache region is responsive, the least recently used region, that is the region that has been accessed least recently, is immediately invalidated and reused by writing thereover, starting with the new address to which no cache region was responsive, for accumulating a substituted cache of information from the main data memory.

28 Claims, 8 Drawing Figures

INSTRUCTION CACHE MEMORY SYSTEM

This is a continuation of application Ser. No. 146,674, filed May 5, 1980, abandoned.

BACKGROUND OF THE INVENTION

The present invention relates to a computer memory system and particularly to such a system for rapidly accessing program information.

In the high speed processor described and claimed in O'Leary U.S. Pat. No. 4,075,704, instructions are rapidly accessed from a high speed program source memory separate from the processor's main data memory for thereby enhancing the operating speed of the processor. While a separate program source memory can be highly advantageous so long as the program is relatively short in length, the cost of the program memory becomes excessive if a large program address space is required. One possible solution to this problem involves the transfer of a portion or block of the program to a fast cache memory for execution, followed by transfer of a second block, and so on. Cache memories of the prior art typically receive one or more blocks or pages of information at a time, each accompanied by a tag identifying that particular block or page.

Unfortunately, the program information which may be desired from memory over a given period of time may not all conveniently reside in the same block or page or in the same group of blocks or pages. In the case of instructions, for instance, a branch or jump may take place specifying a sub-routine outside the originally transferred block or blocks and requiring replacement of the cached information. A block of new information would then be written into cache for accessing the sub-routine, after which return would be made to the main line of the program. Most of the information transferred in the same block or page containing the sub-routine would never be used, and yet two complete block erasures and transfers are required. The use of each sub-routine must, of course, await the initial transfer of the entire block of information containing it. Transferring very short blocks of information to the cache, on the other hand, may not be much different from accessing the same information from main memory in the first place, and can have the additional disadvantage of failing to transfer program loops or repetitively used groups of instructions.

SUMMARY OF THE INVENTION

In accordance with the illustrated embodiment of the present invention, a memory system includes a first memory or main data memory and a higher speed memory or cache adapted to receive information from the first memory for storage and fast retrieval. Means are provided to load a first location in the cache memory with information from the first memory in response to a first access address identifying that information, and the information is substantially immediately outputted for utilization, for example via a computer instruction register or control buffer. Meanwhile, further words from the main data memory are loaded into locations in the cache ahead of or beyond the first loaded location (i.e. at higher numerical addresses than the first loaded location) and in advance of access addressing thereof. The further cached information is available for fast access without awaiting transfer of a particular quantity of information from main memory, and also without terminating transfer of information from main memory. A gradually expanding segment of accessible information is built up in cache.

In accordance with a preferred form of the present invention, cache memory comprises a plurality of independent regions or caches which are interrelated in a cooperative manner to avoid, for example, invalidation or erasure of one portion or part of a program in response to a branch or jump to another portion not contained in a first expanded cache region. Thus, one region of cache may run the main line of a program, while frequently used sub-routines can be stored in other cache regions. When a jump occurs from the main line to a sub-routine, the caller of the sub-routine, e.g. main line instructions, is thereby preserved and is then immediately available after execution of the sub-routine. Of course, execution of the sub-routine does not have to await transfer of an entire block of information from main data memory to fill a second region, but the sub-routine is substantially immediately available for execution.

In a preferred form of the present invention, loading or expansion of cache is accomplished in response to cache use, thereby avoiding extensive filling of a cache when, for example, only a short sub-routine is needed. However, if repeated access is made to a particular cache, the same is expanded whereby the cached information can encompass program loops or the like. For example, if a cache region stores the "main line" of a program, this region may expand to its full physical limit, 256 words in the illustrated embodiment, forming a "window" into main data memory which "moves up" in relation to main data memory as transfers from main data memory to cache continue to take place.

In the illustrated embodiment, four cache regions 14, 15, 16 and 17 (in FIG. 1) are employed and, although this number is found to be advantageous, or course a greater or lesser number of regions could be employed. Each of the available cache regions is suitably filled in response to a new address substantially different from the addresses of information stored in the already filled regions, and when all of the cache regions have had information transferred thereto, the wide variety of information contained therein can be immediately accessed. It may nevertheless occur that a new address is presented to which no cache region is responsive. In such case, the least recently used cache region, that is the region that has been accessed least recently, is invalidated and reused by writing thereover, starting with the new address, for accumulating a cache of information ahead of the new address.

In the illustrated embodiment, each cache region is provided with a bottom pointer, a top pointer and a fetch-ahead pointer with the expanding cache being defined between the bottom pointer and top pointer, while the fetch-ahead pointer expands the cache region by accessing further information from main data memory. To invalidate a region for refilling starting with a new address, it is only necessary to set all the pointers related thereto to the new address, and it is not necessary to erase stored information. Thus, the cache memory regions do not contain valid or invalid information, pointer registers do. As a result, invalidation of a region is very rapid, which materially assists the speed of operation of the present system.

According to a specific version of the invention, if no cache region 14, 15, 16 or 17 (in FIG. 1) stores information corresponding to an asserted address, one of the cache regions 14, 15, 16 or 17 is not immediately invalidated if any of these regions can be expanded within a reasonably short time to encompass the desired information. The processor or computer spins while this expansion takes place, but the unnecessary invalidation of regions, which might include repeatedly used information or loops, is avoided, together with the unnecessary initialization of a region.

It is accordingly an object of the present invention to provide an improved computer memory system for rapidly accessing program information for immediate execution.

It is another object of the present invention to provide an improved computer memory system having the advantages of a separate high speed memory for storing program instructions without incurring the cost penalties attendant to a large amount of program address space in a costly high speed memory.

It is another object of the present invention to provide an improved cache memory system wherein access to a particular word or words is not delayed by a necessity for a transfer of a block of information from main memory, but wherein sufficient information is nevertheless essentially transferred to allow for the retention of program loops and the like.

It is another object of the present invention to provide an improved computer memory system employing variable segment length caching.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figure 1:
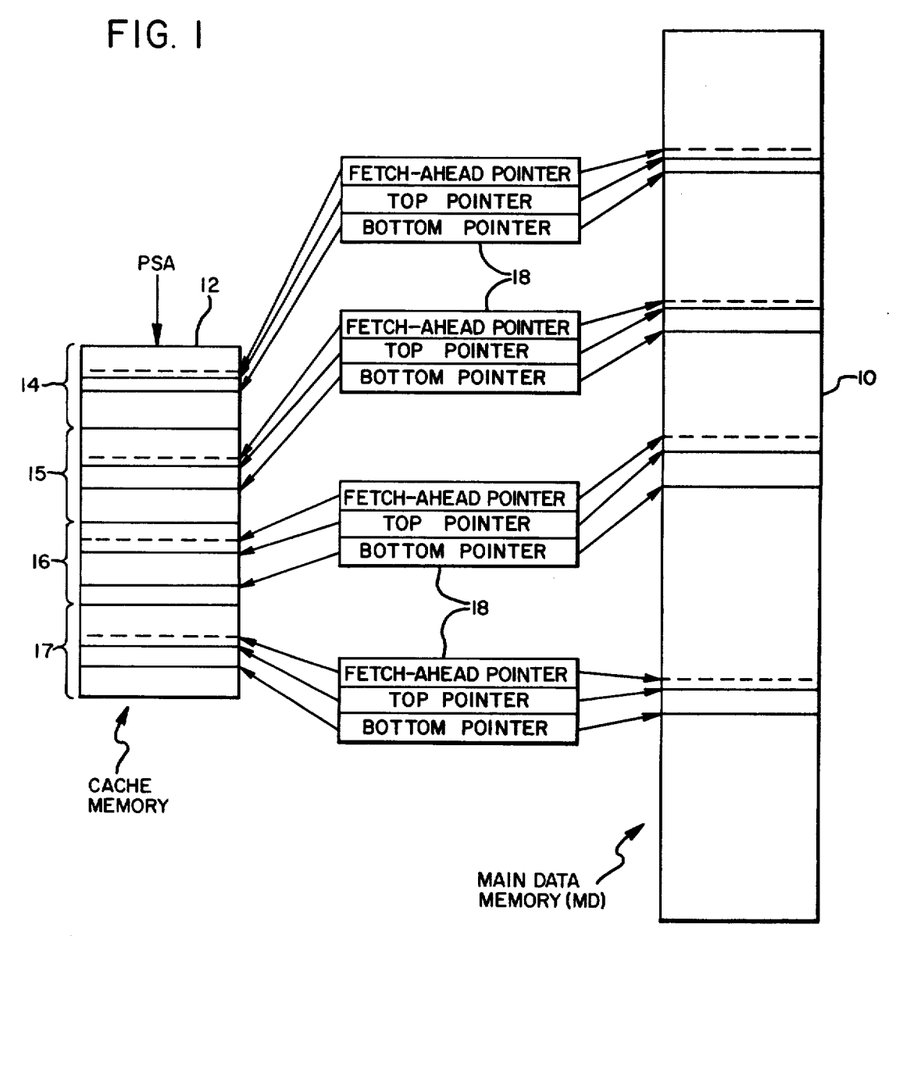
FIG. 1 is a functional block diagram illustrating overall operation of a memory system according to the present invention.

Referring to FIG. 1, memory 10 comprising the main data memory for a data processor, includes an area or areas into which program source words or instructions are sequentially written. An instruction buffer or cache memory 12 is adapted to receive and store a portion of these instructions for rapid access, and suitably comprises a plurality of fast access memory chips wherein the net storage capacity of cache memory 12 is substantially less than main memory 10. In a specific example, cache memory 12 was comprised of four, independent 256 word regions 14, 15, 16 and 17, wherein such storage word was sixty-four bits long corresponding to the instruction or word length in memory 10. Associated with each region is a plurality of registers or similar means for defining a bottom or base pointer, a top pointer, and a fetch-ahead pointer which respectively identify addresses for main memory 10 and addresses for cache memory 12. In particular, the pointers are twenty-four bits long corresponding to the address length for memory 10, with the lower order eight bits being employed for addressing the cache regions 14–17. Each of the regions is suitably managed as a wraparound memory and each is filled on demand from the main memory 10.

The cache memory 12 is accessed by a twenty-four bit long program source address or PSA. Such a program source address may basically comprise a program count value or other arithmetically determined address adapted for a program source memory, for example as described in O'Leary U.S. Pat. No. 4,075,704. Assuming a PSA is asserted for the first time after initialization of the memory system according to the present invention, the bottom pointer as well as the top pointer and fetch-ahead pointer associated with a region, say region 14, are set to PSA. The instruction at that address in memory 10 is transferred to the corresponding address represented by the lower eight bits of the address value in region 14 of the cache memory. The first instruction received in response to the first PSA is then available for immediate use without waiting, for example, for transfer of a block of information (i.e. a group of instructions) from memory 10 to cache memory 12. The bottom pointer retains the first PSA address while the top pointer is moved ahead or incremented as a consequence of the fetch-ahead pointer incrementing and accessing additional instruction words from memory 10, whereby to provide an expanding, fast access "window" of instructions. As each new instruction is fetched by the fetch-ahead pointer, it is placed at the address of the top pointer in region 14 and the top pointer is incremented. The fetch-ahead pointer is also incremented for accessing new instructions and keeping the top pointer ahead of new PSAs. The fetch-ahead pointer expands the region in a background kind of mode on a cycle stealing basis from the main data memory.

When the top pointer reaches the upper limit of addresses in region 14, the information from memory 10 "wraps around" until the bottom pointer is encountered, whereupon the bottom pointer is moved up. Until such time, the bottom pointer retains the initial value and an enlarging or expanding cache is defined. This cache could, for example, include one or more program loops which are thereby retained for use.

If the PSA jumps in value more than incrementally, the corresponding instruction may be accessed from region 14 so long as the PSA is between the top pointer and the bottom pointer. If the PSA jumps above the top pointer, the processor is allowed to spin until the fetch-ahead pointer moves the top pointer to the PSA, if the PSA is within a given range of the present top pointer. The fetch-ahead pointer continues to be incremented so long as the PSA is within a predetermined range or limit with respect to the top pointer, for example within a range or limit of sixteen.

If a new PSA value is not between the bottom pointer and top pointer for region 14, nor within a predetermined range beyond the top pointer, the region 14 is not immediately invalidated, but rather a next region, for example region 15, is employed with the bottom pointer, top pointer, and fetch-ahead pointer associated therewith being set to the new PSA. Again, the bottom pointer remains fixed in value while the fetch-ahead pointer moves the top pointer up in anticipation of increasing PSA values. Assuming the PSA remains within the limits prescribed for region 15, instructions will continue to be accessed therefrom and its fetch-ahead pointer will be moved ahead in preference to the fetch-ahead pointer of region 14, but should PSA change to a substantially different value, a comparison will be made to ascertain whether the new PSA is between the bottom pointer and the top pointer plus range of region 14. If so, the desired instruction will be accessed from region 14, and if not, a new region is selected and so on. Four regions are employed in the embodiment illustrated in FIG. 1, but it is understood a lesser number or greater number of regions can be utilized. More than two are desirable and four have been found to be preferable.

It will be seen the plurality of regions allows cache memory storage and immediate fast access of several sub-routines in one or more regions without discarding the main line of the program in another region and without discarding other sub-routines. Thus the caller of a sub-routine is preserved. The use of four regions has been found advantageous for optimizing fast retrieval of instructions with retention of information for up to four levels of sub-routine nesting and without interfering to too great an extent with the operation of main memory 10.

It is sometimes possible for two regions to expand and cover the same PSA. In such case the most recently used region continues to be utilized as its fetch-ahead pointer continues to expand the top pointer thereof, writing additional instruction words into this region of the cache memory in preference to a region not as recently used. A PSA may be presented for an instruction which is not actually cached in, or in range of, one of the four regions of memory 12, assuming all regions now store instructions. In such case, means hereinafter more fully described selects the least recently used region and the same is invalidated by setting all the pointers thereof to the newly asserted PSA value. Invalidation is in effect immediate, and the instruction at the new PSA value is immediately written into such region for access without substantial delay. No extensive erasure and rewriting of a block of information is required and the fetch-ahead pointer for such region starts building the expanding window of instructions starting from the invalidating PSA as a bottom or base address. Thus, a cache memory region doesn't actually contain valid or invalid information as such, the pointer registers do.

Figure 2:
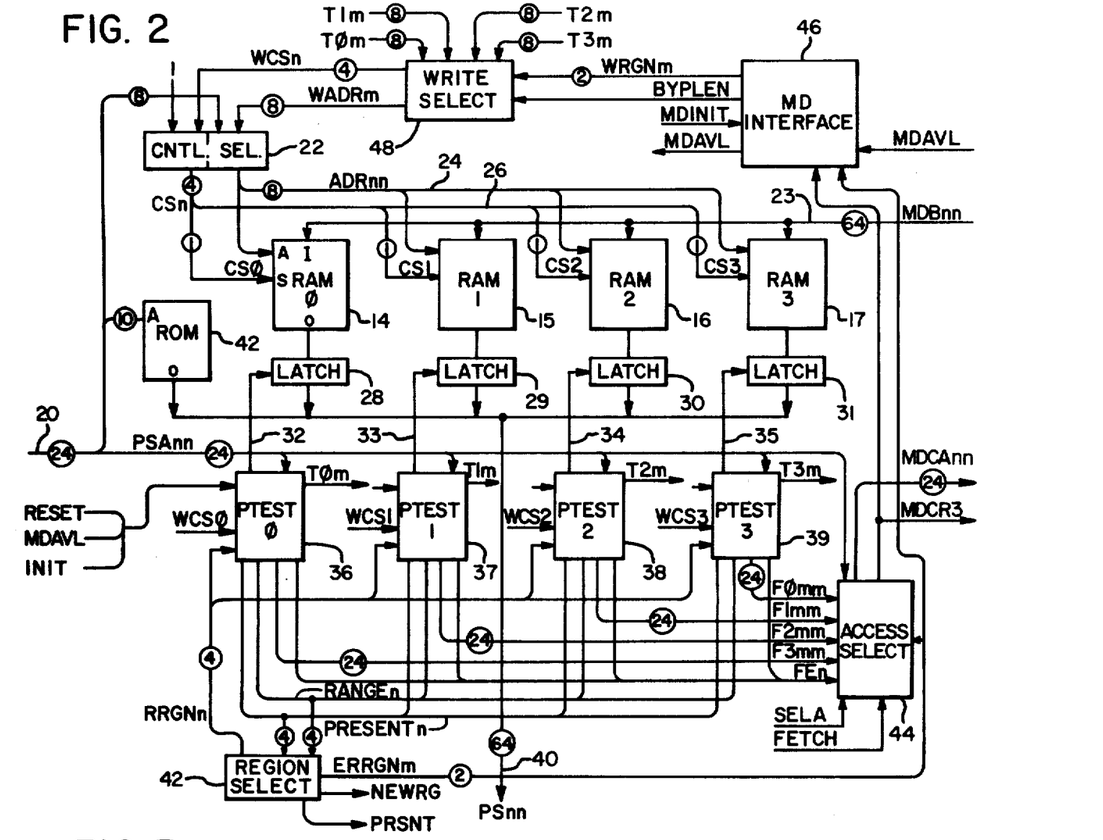
FIG. 2 is a block diagram of a cache memory circuit according to the present invention.

Referring to FIG. 2, illustrating the memory system according to the present invention in greater detail, the program source address input 20 is received in parallel on 24 lines and is designated PSAnn. The lower order eight bits of PSAnn are used to address four random access or RAM memories 14, 15, 16 and 17 via control select multiplexer 22. The RAM memories 14–17 comprise four 256 word fast access static RAM memories and correspond to the similarly numbered regions of the cache memory in FIG. 1. The RAMs 14, 15, 16 and 17 are loaded with sixty-four bit instruction words via input 23 designated MDBnn from a low priority port of the main data memory 10 in FIG. 1, the latter suitably comprising a dynamic RAM memory.

The RAM memories 14–17 are double cycled during each clock period so they may be read during the first half of a cycle and written into during the second half. During the first half of the cycle, control select multiplexer 22 places the lower order eight bits of PSAnn on address lines 24 designated ADRnn, while a one input is provided on chip select or CSn control leads 26 simultaneously providing respective select inputs designated CS0 through CS3. At this time, each of the RAMs is selected and addressed, but only the correct output will be stored in one of the latches 28–31 in accordance with the outputs 32–35 of PTEST units 36–39. Each of the PTEST units receives the full twenty-four bit PSAnn and determines whether the corresponding RAM stores an instruction for the designated address in main data memory. Thus, for example, if RAM 14 stores the desired instruction, PTEST unit 36 will compare PSAnn and provide a PRESENTn signal on line 32 to latch 28. During the first part or the read part of the cycle, the latch unit functions as a pass-through latch when enabled from a PTEST unit, and during the second part holds the value that was present at the end of the first part of the cycle. The desired output of sixty-four bits at 40 is designated PSnn and is suitably provided to a processor instruction register, control buffer or the like.

In each of the PTEST units 36–39, the following four comparisons are made every cycle:

| | |
|---|---|
| PRESENTn | B ≦ PSA < T |
| RANGEn | T ≦ PAS < T + WAIT |
| FEn | T − FLIMIT ≦ PSA < T or RANGEn |
| FULLn | B + 256 = T |

In these expressions, B refers to the bottom or base pointer, T refers to the top pointer and F refers to the fetch-ahead pointer. The first comparison will indicate whether the PSA is between the top and bottom pointers for the particular RAM, and if it is, the appropriate lead 32–35 will be energized. If the PSA is within a range designated by the second comparison, wherein WAIT is sixteen in the present embodiment, the system is caused to spin until the fetch-ahead pointer brings the top pointer up to PSA. A wait factor too large would cause the processor to spin excessively waiting for fetch-ahead to fill to the forward reference. A wait too short will lose loop code causing more frequent spins waiting for a refill. Should a program branch forward out of a loop without a wait factor, the loop would be lost. In the case of nested loops, such behavior would degrade performance.

FEn indicates a fetch enable will be asserted if the PSA is within a predetermined range of the top pointer, wherein FLIMIT in the present embodiment is also sixteen. This initiates a fetch from main data memory for expanding the window of instructions stored in the particular RAM to which the PTEST relates.

FULLn is asserted when the particular RAM is full and as a consequence thereof the bottom pointer is moved up whereby such RAM provides a "moving window" of instructions into the main data memory.

It will be noted the comparisons for ascertaining the presence of the proper instruction within the RAMs is done in parallel with the actual fetching of the instructions from the respective RAMs by PSA. Therefore, rapid access is enhanced.

In addition to the four RAMs, the system includes a ROM or read-only-memory 42 which can be selected according to designated ten lower order bits of PSAnn. Its output is also provided, when selected, at output 40.

As hereinbefore mentioned, there may be times when a particular instruction is not available in any of the RAMs 14 through 17. In this case the least recently used RAM is invalidated by setting its top, bottom and fetch-ahead pointers to the PSA value and the required instruction is inserted into the least recently used RAM. An expanding window of instructions is loaded into such RAM starting with the asserted PSA value. Region select unit 42 arbitrates between the different RAMs and selects the least recently used one for invalidation and insertion of the newly desired information. Each of the RAMs has its contents expanded in accordance with a changing fetch-ahead pointer if the RAM is being used. Thus it is preferred to expand the contents of the most recently used RAM in preference to others that may not be accessed as often, and the determination of the most recently used RAM is also made by the region select unit.

Region select unit 42 provides a two digit binary output ERRGNm indicating the RAM selected for filling whether it be the most recently used RAM when one of the RAMs responded to PSAnn, or the least recently used RAM invalidated when none of the RAMs responded to PSAnn. ERRGNm operates access select multiplexer 44 which then uses one of the corresponding fetch-ahead pointers F0mm F1mm, F2mm or F3mm and appropriate fetch enable signal FEn for the RAM selected. FEn becomes a fetch request MDCR3 forwarded to the main data memory and the fetch-ahead pointer Fnmm becomes MDCA or the fetch address to the main data memory. The region select unit 42 makes its decision on the basis of the PRESENTn outputs of the PTEST units, i.e. whether PSA was between the top and bottom pointers for one of the RAMs, and if not then on the basis of RANGEn indicating one of the RAMs was within predetermined range of acquiring the desired instruction. If none of the RAMs was either present or in range, then ERRGNm represents selection of the least recently used RAM. The signal RRGNn, a four line decoded version of ERRGNm, is provided to the respective PTEST units for changing the pointer values of the least recently used RAM to the PSA value when no RAM is found having an instruction corresponding to the PSA value. At this time, NEWGR is asserted.

ERRGNm is also coupled to main data interface 46 which performs a timing function. This unit is pipelined to correspond to retrieval of information from the main data memory, and provides ERRGNm as an output WRGNm several clocks later in synchronism with information received from the main data memory on input 24, namely MDBnn, corresponding to the request. An output BYPLEN is also asserted when both MDCR3 and MDAVL or main data available are both present, to form an acknowledgement in synchronized time relation and this enables the WRGNm value into WRITE select unit 48. WRITE select unit 48 comprises a multiplexer and provides the eight least significant bits of one of the top pointers, T1m, T0m, T2m, or T3m from the PTEST units as an output WADRm in accordance with the RAM selection indicated by WGRNm. WRGNm is further decoded to write chip select signal WCSn on four lines and is applied to multiplexer 22 together with WADRm. WCSn and WADRm are selected during the second or write half of each cycle such that the RAM selected for writing receives the instruction word accessed from the main data memory at the address indicated by the selected top pointer, T0m, T1m, T2m or T3m. The WCSn signal is also applied to the PTEST unit for then incrementing the appropriate top pointer.

Thus, the contents of the selected RAM are expanded and the top pointer is moved up to provide variable segment length caching. It will be seen that the most recently used RAM will be the one expanded and in general the RAM containing the main line of the program will be expanded most rapidly until that RAM is full, whereupon the window represented thereby is moved up in main memory, always retaining a substantial body of instructions in a given RAM to accommodate expected program loops. Beginning loading of the RAMs after initialization will be hereinafter more fully described.

The operation of a memory system according to the present invention will be more fully described with reference to one of the more detailed drawings illustrating portions of the circuitry as follows:

PTEST Unit

Figure 3:
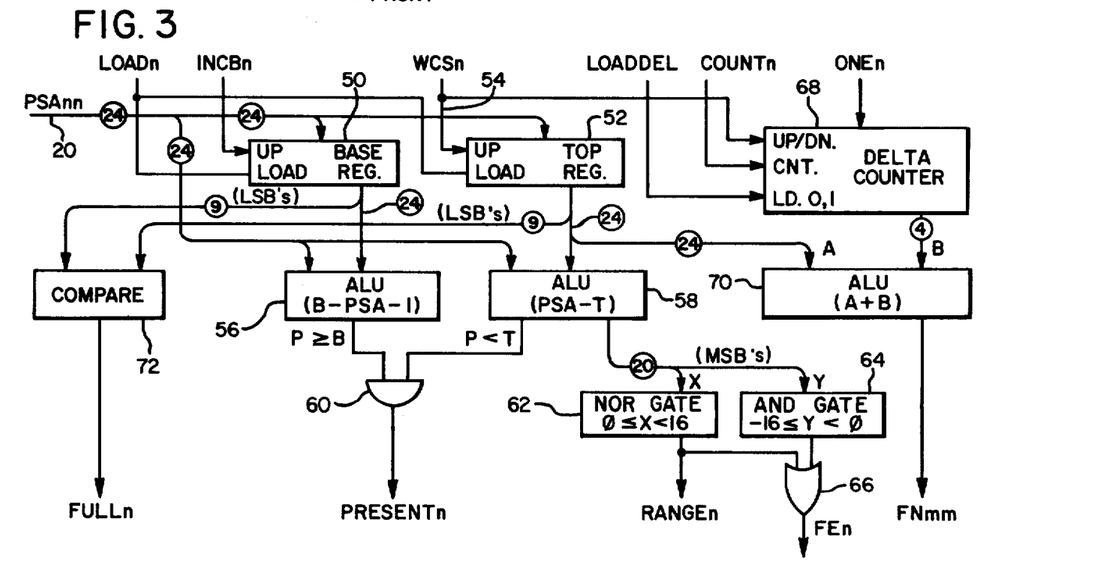
FIG. 3 is a block diagram of a PTEST unit of the FIG. 2 circuit.
Figure 4:
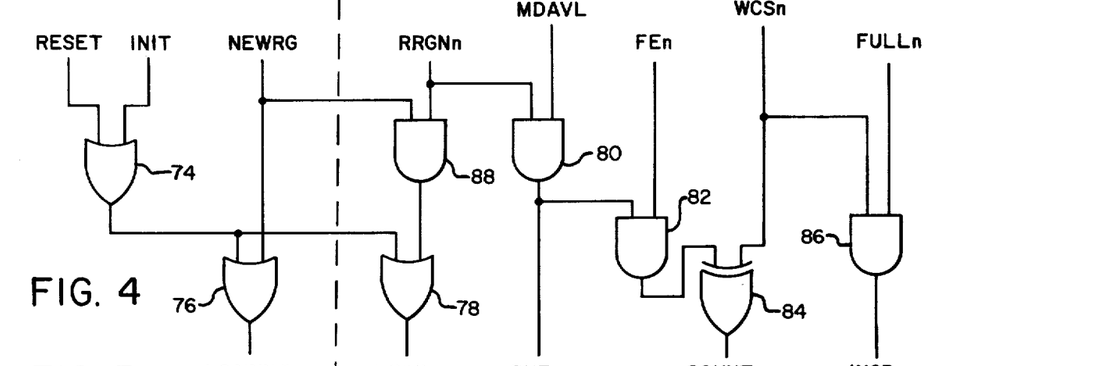
FIG. 4 is a logical diagram of gating circuitry for a PTEST Unit.

The PTEST unit is more fully illustrated in FIGS. 3 and 4 wherein FIG. 4 shows control gating circuitry with the portion of the circuit to the right of the vertical dashed line individually relating to a particular PTEST unit, while the circuitry to the left of the vertical dashed line is common to the four PTEST units. Thus, the control signal NEWRG is common to the PTEST units, as is the output of OR gate 74 receiving RESET and INIT as inputs. RESET is basically the same control signal as master clear used elsewhere in the system and INIT is the cache initialize control signal.

Considering first FIG. 3, each PTEST unit includes a twenty-four bit, counting, base register or bottom register 50, and a twenty-four bit, counting, top register 52, which respectively store the bottom pointer and top pointer for a region. Both registers are first loaded with PSAnn from input 20 as hereinbefore mentioned, and while the base register retains the PSA value, the top register 52 is counted upwardly in accordance with the WCSn indication on lead 54 to increase the top pointer each time the corresponding RAM receives an additional instruction word. The output of base register 50 is applied to ALU 56 together with the current PSA value, said ALU comprising an arithmetic-logic unit with fast carry look ahead and suitably comprising a type 181 ALU manufactured by Motorola, Inc. ALU 56 operates according to the expression $B-PSA-1$ with the output of unit 56 being the sign of the result. It will be seen that a positive output is produced if $P \geq B$, where P is short for PSA. Similarly, the output of top register 52 is applied to ALU 58 in conjunction with the PSA value, ALU 58 suitably being of the same type as ALU 56 and operating according to the expression $(PSA-T)$. The sign of the result is provided as an output indicating $P<T$. The outputs of ALU 56 and 58 are both supplied to AND gate 60, the output of which is designated PRESENTn, indicating that the PSA value is between the base or bottom pointer and the top pointer. As hereinbefore indicated, PRESENTn is applied for enabling one of the RAM output latches 28–31 and is also coupled to region select unit 42 in which the most recently used RAM and the least recently used RAM are categorized.

The twenty most significant bits of the difference $(PSA-T)$ from ALU 58 are coupled to NOR gate 62 and to AND gate 64 for respectively producing an indication of $0 \leq X < 16$, and an indication of $-16 \leq Y < 0$. Nor gate 62 provides the output RANGEn when PSA is within a WAIT range of sixteen above the top pointer, and this output is coupled to the region select unit. The effect is to cause the system to spin until the fetch-ahead pointer moves the top pointer beyond PSA. The output RANGEn and the output of AND gate 64 are coupled as inputs to OR gate 66 for producing the fetch enable signal, FEn. Thus, a fetch from main data is enabled when the PSA is within a plus or minus sixteen of the top pointer where in this case FLIMIT is also equal to sixteen. This allows moderate expansion of the cache windows without interfering excessively with the operation of the main data memory. In the constructed embodiment, it appears a RANGE value and an FLIMIT value of sixteen will avoid undesired interference with the main memory while also avoiding slow down in operation of the cache memory system. The fetch enable signal thus indicates a RAM is in an area for fetching and is coupled to access select unit 44 as hereinbefore indicated.

A four bit up-down counter 68 in conjunction with ALU or adder 70 is utilized for providing the fetch-ahead address Fnmm. Since the fetch-ahead address or pointer is suitably designated as within a predetermined range or numerical difference from a top pointer, the same can be handled as a DELTA value accumulated in counter 68 which is added to the top pointer in adder 70. As hereinbefore indicated, the fetch-ahead address Fnmm is applied to access select unit 44 where it may be used as an address to fetch an instruction word from the main data memory.

The output FULLn is conveniently provided by comparison circuit 72 receiving the nine least significant bits of the outputs of registers 50 and 52. If the eight least significant bits are the same, and the ninth least significant bits are different, as ascertained in comparison circuit 72, then the top pointer will differ from the bottom pointer by 256. Hence the FULLn output is produced which is coupled to increment the base register.

The control gating for the PTEST circuit is illustrated in FIG. 4. As mentioned, the circuitry to the left of the vertical dashed line is common to the various PTEST units, while the circuitry to the right of the same line is restricted to an individual unit. In the case of either a reset signal or a cache initialize signal from the processor, OR gate 74 provides inputs to OR gates 76 and 78. Gate 78 supplies a control signal LOADn employed, as indicated in FIG. 3, as an input to base register 50 and top register 52 causing these registers to be loaded initially with the PSA value. At the same time, OR gate 76 produces control signal LOADDEL as an input to counter 68, functioning to load the counter with either a zero or a one dependent upon other inputs to the counter. If the particular RAM associated with the described PTEST unit is initially selected for operation, and if the main data memory is available, then the control signals RRGNn and MDAVL will be active providing inputs to AND gate 80 producing a control signal ONEn applied to counter 68. In such case, the counter 68 associated with the initially selected RAM will be loaded with a one rather than a zero.

During subsequent operation, the counter 68 may be counted up to increase the value of the fetch-ahead pointer. Thus, if RRGNn is active indicating the corresponding RAM is selected and if MDAVL is active indicating the main data memory is available, and also if FEn is active indicative of a fetch enable, then both the inputs of AND gate 82 will be energized which in turn supplies an input to exclusive OR gate 84 resulting in the control signal COUNTn. COUNTn causes counter 68 to count up by one if WCSn is inactive. Of course the RAM selected and the DELTA counter 68 counted up in a given instance will not necessarily be the ones first selected, but may comprise one of the other RAMs and its DELTA counter according to the selection signal RRGNn produced, e.g. in response to the indication that the instruction corresponding to a PSA is found in a RAM.

If no information in the form of instruction words is received by the corresponding RAM from the main data memory, its DELTA counter 68 will indeed count up. If in the same cycle there is information coming back, WCSn will be active and, as indicated in FIG. 4, exclusive OR gate 84 will be disabled. Therefore, the DELTA counter will hold its same value. The fetch-ahead pointer will increase as the top pointer increases because of the addition in ALU 70.

If a given RAM is receiving information from main data memory, but the RAM is not at the moment selected then WCSn will cause GATE 84 to provide a COUNTn output, and the same WCSn signal applied to DELTA counter 68 will cause the same to count downward by one. As hereinbefore indicated, each time an instruction word is received by RAM, the corresponding top register 52 is counted upwardly by one, and hence the fetch-ahead address supplied from adder 70 will remain the same.

When WCSn is activate and FULLn is active, AND gate 86 will provide the signal INCBn which will count base register 50 up by one. Thus each time an instruction word is received back for entry into a RAM that is full, the base register 50 associated therewith is incremented upwardly by one.

In the event a PSA is received which finds no instruction in any of the RAMs and hence none are selected on that basis, NEWRG will become active and the selection signal RRGNn for the least recently used RAM will be active so as to provide an output from AND gate 88 causing OR gate 78 to produce a LOADn control signal. Consequently, the base register and top register associated with the least recently used RAM will be loaded with PSAnn. Meanwhile, LOADDEL will also be asserted whereby DELTA counter 68 for the corresponding RAM will be loaded with a one if MDAVL is also active. LOADDEL is also applied to the DELTA counters associated with the other RAMs, returning the same to zero for bringing down the fetch-ahead pointers thereof to the top pointer. The least recently used and just invalidated RAM may have had a fetch coming from main data memory in the pipeline, but it is unknown which one it is or whether it is even there. Consequently, the fetches are discarded and each of the fetch-ahead pointers is reduced to the top pointer value.

Region Select Unit

Figure 5:
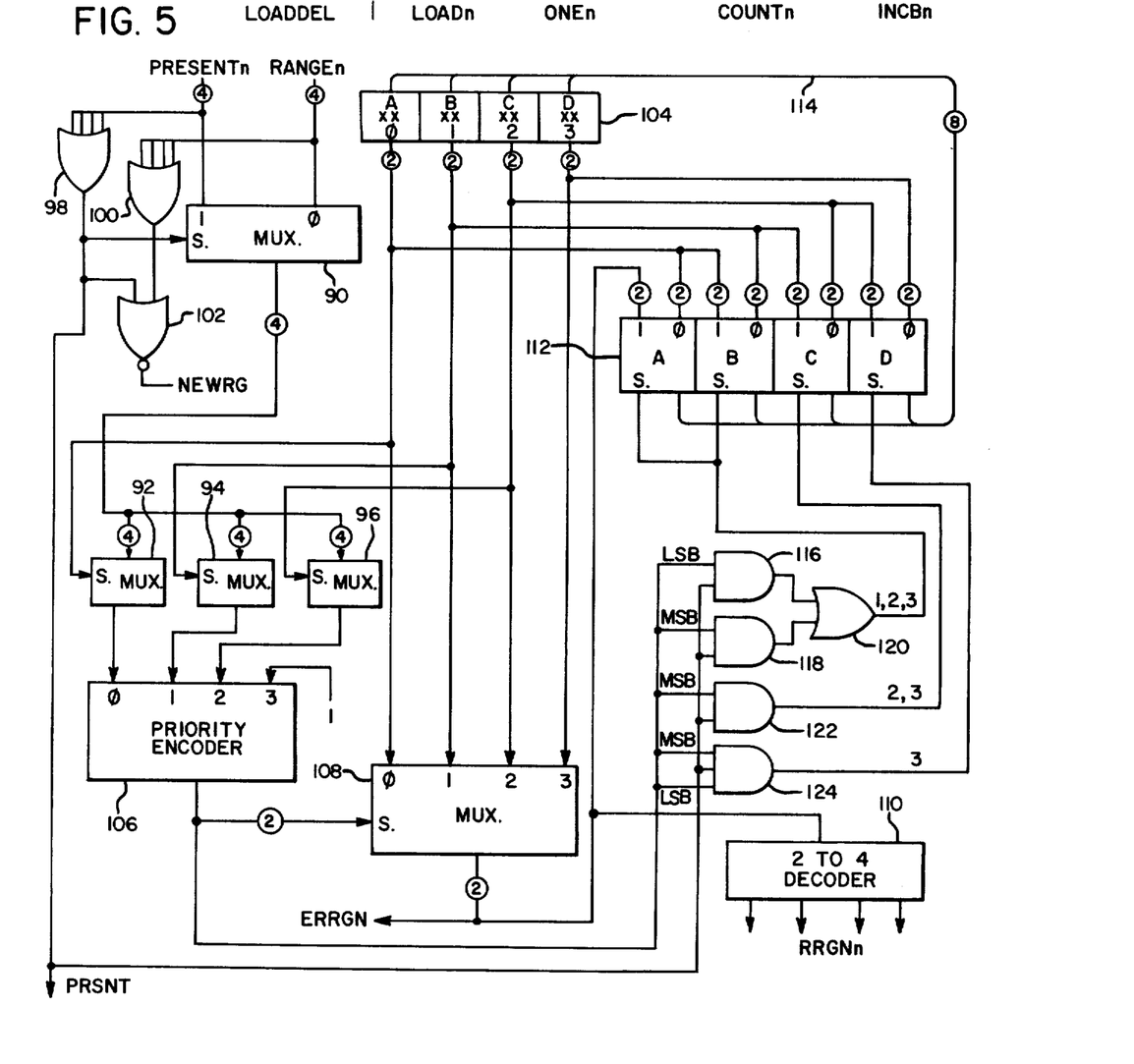
FIG. 5 is a block diagram of the region select unit of the FIG. 2 circuit.

As hereinbefore mentioned, the region select unit arbitrates between different cache memory regions, that is between the RAMs 14-17, and selects the least recently used region or RAM when the PSA is not between the top pointer and base pointer or within range of any RAM. Also, the region select unit causes expansion of the most recently used region in preference to the others.

Referring to FIG. 5, the four PRESENTn outputs from the four PTEST units and the four RANGEn ouputs from the four PTEST units are applied to multiplexer 90 which delivers either the PRESENTn or RANGEn outputs to priority multiplexers 92, 94 and 96. The four PRESENTn outputs are coupled to OR gate 98, the output of which comprises the select input of multiplexer 90 such that if any of the PRESENTn indications are asserted, the four PRESENTn values will appear at the output of multiplexer 90. Otherwise the output of multiplexer 90 comprises the four RANGEn indications. The output value from OR gate 98 is designated PRSNT, indicating that at least one of the PTEST units provided a PRESENTn output, and PSSPIN, a control signal for causing the processor to spin awaiting a PRESENTn indication, is substantially the inverse of PRSNT. The four RANGEn outputs of the PTEST units are applied to OR gate 100 which in turn drives NOR gate 102 in conjunction with the output of gate 98 to provide the NEWRG indication for the control gating of the PTEST units. (See FIG. 4.)

The select inputs for priority multiplexers 92, 94 and 96 are provided from "least recently used" register 104. The register 104 not only stores the identity of the least recently used RAM in section D thereof, but also stores the identity of the most recently used RAM in section A. Each of the sections, A, B, C and D, store a a two digit code identifying in binary fashion the identity of the respective RAMs. For example, considering the sections of register 104 from left to right, they could in a given instance store the RAM designations 0, 1, 2 and 3 for indicating RAMs 14, 15, 16 and 17 respectively. In such case, RAM 14 would be identified as the most recently used and RAM 17 would be identified as the least recently used. Of course, the stored information in register 104 changes from time-to-time in accordance with the operation of the system. In any event, the outputs from sections A, B and C of register 104 are applied as select inputs to the priority multiplexers 92, 94 and 96 respectively. Assuming for the moment that region "2" corresponding to RAM 16 contains information identified by PSA, and PTEST unit 38 correspondingly generated a PRESENTn output, then priority multiplexer 96 will provide an output to the input 2 of priority encoder 106. This is for the reason that in the suggested example the third of four output lines from multiplexer 90 was active (indicating PRESENTn for region "2") and the others were assumed for the present to be inactive. Priority multiplexer 92 selects the first output line from multiplexer 90, priority multiplexer 94 selects the second output line from multiplexer 90, and priority multiplexer 96 selects the third or only active output line from multiplexer 90, whereby an input 2 is indicated for priority encoder 106. Priority encoder 106 then selects the highest ranking input and supplies the same as a coded output for operating multiplexer 108 to select a section of register 104, in this case section C. If the output of multiplexer 94 were also active, then priority encoder 106 would select that one as being higher ranking. A one input is provided to input 3 of priority encoder 106 such that input 3 will supply an output by default should none of the other inputs be active.

The code from priority encoder 106 will select one of the region identifications from register 104 as ERRGN. This identification is utilized in access select unit 44 for bringing about a fetch-ahead request and ERRGN is decoded in 2 to 4 decoder 110 to generate RRGNn.

Again, it will be realized that the identifications of regions or RAMs as stored in register 104 are not necessarily 0, 1, 2 and 3 in succession but may be quite different. In any case, the output of multiplexer 108 identifies the highest priority (as far as most recent use is concerned) RAM whose PTEST unit has generated a PRESENTn indication. Thus, should more than one PTEST unit output a PRESENTn indication, then the output of multiplexer 108 will identify selection of the one of highest priority.

For the system to be effective, register 104 must be continually updated. Multiplexers 112, identified employing section designations A, B, C and D, normally receive outputs from register 104 and supply the same outputs back into register 104 for the following cycle via cable 114. However, should one or more of the select or S inputs of multiplexers 112 be active, then the contents of register 104 will be shifted on the following cycle. The non-selected input of multiplexer section A receives an output of register 104, section A, and feeds that output back into the input of register 104, section A, and so on. However, the selected input of multiplexer 112, section B is the output of register 104, section A. Also, the selected input of multiplexer section C is the output of register section B, and the selected multiplexer input of section D is the output of register section C. The selected input of multiplexer section A is ERRGN, or the output of multiplexer 108. Assuming the most recently used identification in register 104, corresponding to section A, is to remain unchanged, then a 0 selection by multiplexer 108 will have no effect on multiplexers 112. However, should the 1, 2 or 3 inputs of multiplexer 108 be selected by the output of priority encoder 106, the contents of register 104 will be changed. The least significant bit and the most significant bit of the output of priority encoder 106 are applied to AND gates 116 and 118 in conjunction with PRSNT, and the outputs of each of these AND gates are supplied to OR gate 120 generating the select signals for multiplexer 112, sections A and B. The most significant bit in the output of priority encoder 106 is coupled to AND gate 122 in conjunction with PRSNT, and the output of that AND gate is coupled as the select input for multiplexer 112, section C. The least significant and most significant bits in the output of priority encoder 106 are supplied in conjunction with PRSNT to AND gate 124, the output of which is employed as the select input of multiplexer 112, section D. The region or RAM designations 0, 1, 2, 3 will therefore remain 0, 1, 2, 3 if the output of the priority encoder is 0. The contents of register 104 will change from 0, 1, 2, 3 to 1, 0, 2, 3 should the output of priority encoder 106 be 1 for the reason that ERRGN is supplied as the selected input in multiplexer section A, and the former contents of register 104, section A, are transferred to B as the result of operation of gate 120. Should priority encoder 106 provide a 2 output, then again ERRGN is supplied section A of register 104 by way of section A of multiplexer 112. Also, the former contents of section A of register 104 are transferred to section B, and the former contents of section B are transferred to section C under control of gates 120 and 122. Therefore, 0, 1, 2, 3 in register 104 will become 2, 0, 1, 3. Should the output of priority encoder 106 be a 3, then the outputs of gates 120, 122 and 124 are active such that the contents of section A in register 104 are shifted to section B, the contents of section B are shifted to section C, the contents of section C are transferred to Section D, and of course ERRGN is transferred to section A. Thus, contents 0, 1, 2, 3 in register 104 would become 3, 0, 1, 2.

In case none of the cache memory regions or RAMS contain an instruction identified by PSA, and none are in range, then priority encoder 106 automatically selects the least recently used region, because of the one value at its input 3, and ERRGN identifies the same. It will also be noted that NEWRG is asserted from gate 102 with the consequences hereinbefore described of invalidating a region or RAM by setting all the pointers thereof to the PSA and starting storage in said RAM of an expanded window of instructions at the new PSA value.

If none of the PTEST units provide a PRESENTn output, but a RANGEn output is provided, it will be noted the region in range will be identified by ERRGN in the same manner as hereinbefore described since priority multiplexers 92, 94 and 96 will receive range identification from multiplexer 90. However, the contents of register 104 will not be changed since the PRSNT control signal will not be present at gates 116, 118, 122 and 124. Thus the identification of most recently used and least recently used regions will remain unchanged. The designation of use is dependent upon the occurrence of a PRESENTn, and the region or RAM is not actually used unless an instruction is actually fetched out. Meanwhile, the inverse of PRSNT or PSSPIN is asserted causing the processor to spin until the fetch-ahead pointer for the selected RAM brings the top pointer up to PSA.

For cache initialization, the contents of register 104 are forced to 0, 3, 2, 1, therefore identifying the most recently used regions as 0 and the least recently used region as 1. Since no regions have been used, this causes the cache memory to start off using region 0, and next to select region 1 since it is temporarily designated at least recently used. At initialization, the multiplexer 108 is also forced to select the 0 input.

Access Select Unit

Figure 6:
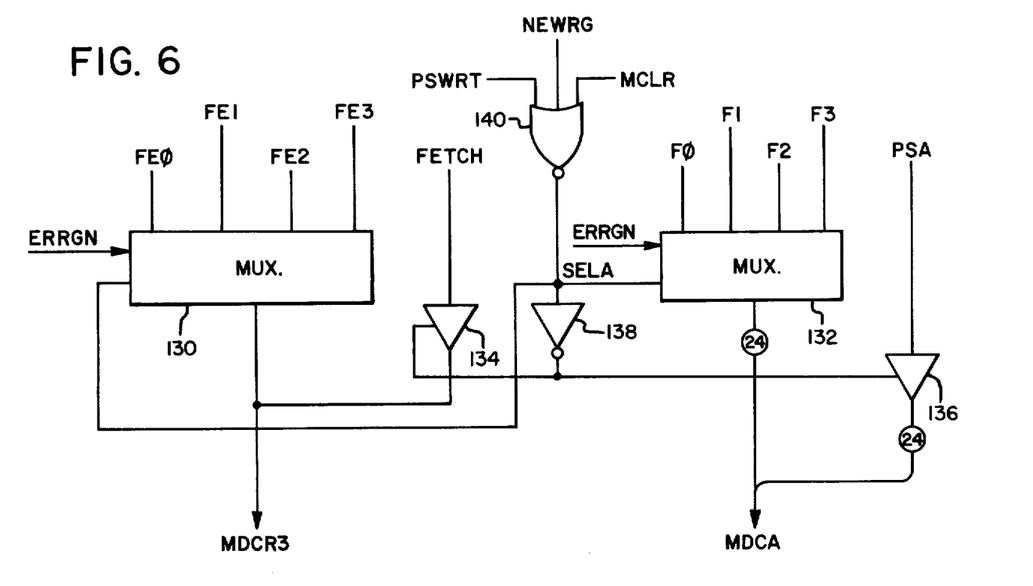
FIG. 6 is a block diagram of the access select unit of the FIG. 2 circuit.

The access select unit basically selects one of the 24-bit fetch-ahead addresses generated by the PTEST units, and one of the corresponding fetch enable outputs, dependent upon the region selection output ERRGN of the region select unit. The fetch enable FEn then becomes a fetch request MDCR3 and the fetch-ahead output Fnmm becomes the fetch address MDCA for main data memory.

Referring to FIG. 6, multiplexer 130 selects one of the fetch enable inputs FE0, FE1, FE2, or FE3 based on the selection signal ERRGN and provides the result MDCR3 to the main data memory. Similarly, multiplexer 132 receives the fetch enable addresses F0, F1, F2, and F3, and makes a selection on the basis of ERRGN, providing the resultant fetch address MDCA to the main data memory. A fifth alternative output for MDCR3 and MDCA is provided by FETCH coupled to driver 134 and PSA coupled to driver 136. These alternative outputs are normally disabled by the presence of SELA, the select address control applied to amplifiers 134 and 136 via inverter 138. However, SELA is generated by NOR gate 140 receiving inputs PSWRT, NEWRG, and MCLR. PSWRT is a software cache initialize control signal or version of the cache intialize command from software, MCLR is the master clear control, and NEWRG is the already described output of the region select unit indicative that a given region or RAM needs to be invalidated and restarted at PSA. In the case of either NEWRG or PSWRT being asserted, PSA is supplied as the fetch address for the main data memory whereby the invalidated region will immediately receive the instruction word at the PSA address. FETCH is normally active when either PSWRT or NEWRG is asserted to supply the fetch request. When MCLR, or master clear is asserted, FETCH is not present and therefore no fetch is accomplished. The MDCA lines are low priority MD port address lines and MDCR3 is the cycle request for the port.

Main Data Interface

Figure 7:
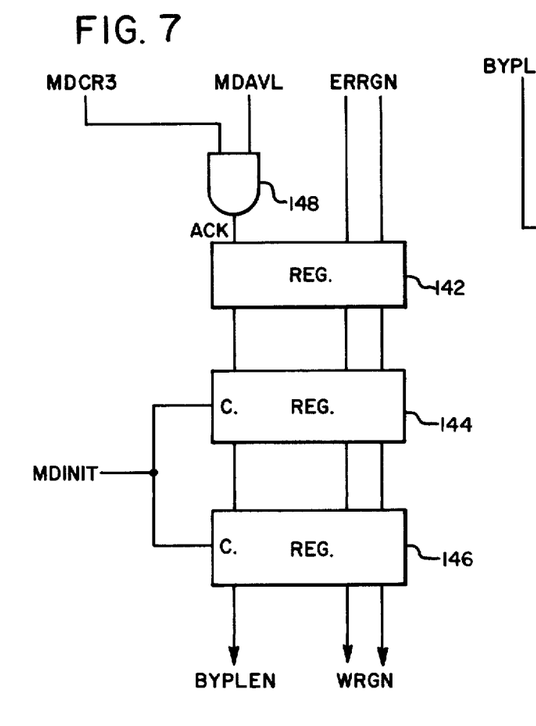
FIG. 7 is a block diagram of the main data interface unit of the FIG. 2 circuit.

The main data memory in the present system is pipelined and consequently instruction words are received at a predetermined time after a request is made. Therefore, MD Interface unit 46 is pipelined for keeping track of the selected region or RAM into which an instruction word is to be placed. The MD Interface unit keeps the presence and region code for each stage of outstanding requests. Referring to FIG. 7, the MD Interface suitably comprises registers 142, 144 and 146 in cascade relation wherein each register stores a selection signal ERRGN from the region select unit and an acknowledge signal ACK, the latter being derived from AND gate 148 upon the coincidence of MDCR3 and MDAVL. MDCR3 is the fetch request signal to main data memory and MDAVL is active when the main data memory is able to take the fetch request. If the MDAVL and MDCR3 signals are both active at the end of the cycle, then the main data memory will begin a fetch operation for the cache unit. ACK is basically a cycle acknowledge to indicate an access is going to happen and is registered to become a presence indicator in the pipeline. When the ACK signal is successively stored in registers 142, 144 and 146, it is identified as BYPLEN for indicating there is now an instruction word coming back from the main data memory, and is used to enable the write chip select signals or WCSn in write select unit 48. The region or RAM selection or identification ERRGN is also passed successively through registers 142, 144 and 146 and becomes WRGN applied to write select unit 48 where the same is decoded to WCSn.

A control signal MDINIT is generated in response to system initialization, master clear MCLR and for NEWRG and is employed for clearing registers 144 and 146. Thus, in the event NEWRG is asserted and a region or RAM is to be invalidated and set to PSA, the information in the last two stages of the pipeline is thrown away. The region being reinitialized may have had a fetch coming in the pipeline, but it is unknown which one it is or whether it is even there. Consequently the fetches are discarded, and the fetch-ahead pointers are reduced to the same value as the top pointers as hereinbefore indicated. All of the stages will be clocked and the contents of the registers moved forwardly each cycle unless otherwise noted.

If the main data memory is going to spin for an interleave failure or a refresh cycle, a control signal PCSPIN from main data memory will be active and indicates operation will be delayed for one cycle. The contents of register 142 are caused to remain there, but the contents of registers 144 and 146 are moved forwardly. Register 144 will be loaded with zeros.

Write Select Unit

Figure 8:
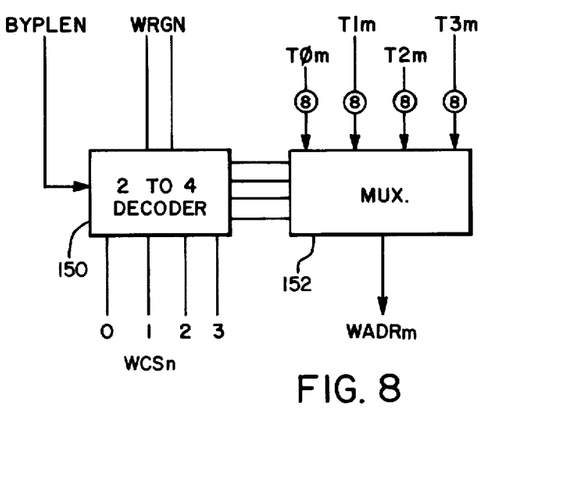
FIG. 8 is a block diagram of the write select unit of the FIG. 2 circuit.

Referring to FIG. 8, the write select unit includes a 2 to 4 decoder 150 which translates WRGN from the MD Interface to the four WCSn lines providing an input to control select multiplexer 22 were the same become CSn for selecting a RAM during the write part of a cycle. The 2 to 4 decoder 150 is enabled by BYPLEN, or only when there is an instruction word coming back from the main data memory. The four outputs of the 2 to 4 decoder 150 also operate multiplexer 152 which receives the least significant eight bits of each of the top pointers T0m, T1m, T2m and T3m from the top pointer registers in the PTEST units. The selected top pointer comprises the WADRm output of multiplexer 152 and is supplied to multiplexer 22 which selects the same for supplying the ADRnn output during the write part of the RAM cycle. Thus, the selected RAM is enabled and addressed, and will receive and store the instruction word from the input MDBnn.

Briefly considering overall operation of the system, it is seen that an instruction word is accessed substantially immediately from main data memory in response to a PSA, and the cache builds ahead of this PSA to provide a variable segment cache or window for rapidly responding to subsequent PSAs excepted in the same general sequence. The cache system does not await transfer of a block of instructions from memory before outputting the first one, but provides the first requested instruction while continuing to build ahead of the PSA in a background kind of mode. Further instructions are secured from the pipelined memory and placed in cache memory for immediate access in sequence with the first instruction.

Several regions of RAM are provided so that a jump can be made to another series of instructions, for example for executing a sub-routine, without losing the caller of the sub-routine. Four levels of RAM are found to be of advantage. Cache memory regions of adequate size are provided and previously accessed instructions are retained in each for accommodating loops within each region.

When none of the RAMs respond to a PSA, the pointers associated with a least recently used RAM are set to that PSA value whereby the RAM is rapidly invalidated for reuse and access is immediately made corresponding to such PSA value. No additional time is required for erasing a cache or transferring a new block of data. The RAM is filled ahead of the PSA value, opening up a new window for immediate fast access.

It is also noted that the RAM expanded is always the one being used in preference to RAMs which may contain occasionally used information. Thus, the RAM containing the main line of the program will usually continue to expand until the entire RAM, here 256 words, is filled, whereupon the whole window moves up in memory, keeping ahead of the PSA value.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a memory system including a first memory means,
   - a higher speed memory means for receiving information from said first memory means for storage and fast retrieval,
   - means for loading a first address location in said higher speed memory means with information from said first memory means in response to a first presentation of an address, which address is capable of accessing information in either memory means, said first address location being identified by said address,
   - means for substantially immediately outputting said information,
   - and means for bringing about repeated loading of further information into said higher speed memory means from said first memory means at further address locations consecutively beyond the first address location and in advance of further access to retrieve the further information, while retaining the loaded information in the higher speed memory means, at least within predetermined limits of the higher speed memory means, to provide a gradually expanding segment of information from said first memory means in said higher speed memory means for retrieval.

2. The memory system according to claim 1 wherein said higher speed memory means receives information at an address equal to or greater than a base pointer address and equal to or less than a top pointer address, and means for invalidating said higher speed memory means to receive new information from the first memory means, said new information having an address in said first memory means, comprising means for setting said base pointer address and top pointer address to a value corresponding to the address of the new information in the first memory means.

3. In a memory system including a first memory means,
   - a higher speed memory means for receiving information from said first memory means for storage and fast retrieval, said higher speed memory means having a plurality of separate regions,
   - means for loading a first location in a first of said regions in said higher speed memory means with information from said first memory means in response to a first access address of said information, which access address is capable of addressing information in either memory means,
   - means for bringing about loading of further information into said first of said regions of the higher speed memory means from said first memory means at locations consecutively beyond the first location in response to access addresses beyond said first access address and in advance of further access addressing to provide an expanding segment of information from said first memory means in said first of said regions of the higher speed memory means for retrieval in response to said further access addressing as relates to information stored in the said first of said regions of the higher speed memory means,
   - means for loading a first location in a second of said regions in said higher speed memory means with information from said first memory means in response to a second access address for information which is unrelated in proximity of address to information stored in the said first of said regions of the higher speed memory means, and means for bringing about loading of further information into the second of said regions of the higher speed memory means from said first memory means at locations consecutively beyond the first location in the second of said regions in response to access addresses beyond said second access address and in advance of further access addressing therefor to provide an expanding segment of information from said first memory means in the said second of said regions for retrieval in response to further access addressing as relates to information stored in the said second of said regions of the higher speed memory means.

4. The memory system according to claim 3 wherein each of said means for bringing about loading of further information into each of said regions is provided with means responsive in its operation to the access of information from that region for expanding a more frequently used region in preference to a less frequently used region.

5. The memory system according to claim 3 including means for retrieving information from one of said regions in response to an asserted access address, said retrieving means comprising plural means for simultaneously comparing said asserted access address with addresses of information stored in said regions, means for concurrently with said comparison accessing information form said regions as addressed by least significant bits of said asserted access address, and means for outputting information from one of said regions as causes a favorable comparison in said plural means for simultaneously comparing.

6. The memory system according to claim 3 wherein said regions each receive information for storage at an address equal to or greater than a base address and equal to or less than a top address, and means for rapidly invalidating a region for receiving new information from the first memory means and having an address is said first memory means, said invalidating means comprising means for setting the base address and the top address to the address of the new information for retrieval from said first memory means.

7. The apparatus according to claim 6 including means for initiating the rapid invalidating of a region when no region is responsive to a said further access address.

8. The apparatus according to claim 7 including means for determining the least recently accessed region, said means for initiating the rapid invalidating of a region being responsive thereto for invalidating the least recently accessed region.

9. In a memory system including a first memory means, a higher speed memory means for receiving a series of instructions from said first memory means for storage and faster retrieval in response to a program source address, wherein said program source address defines addressed locations in either memory means, means for loading said higher speed memory means from said first memory means in response to assertion of a first program source address with a first instruction at that address, and means for bringing about loading of further instructions into said higher speed memory means from said first memory means at addresses in said higher speed memory means consecutively beyond the first address and desirably beyond subsequent access addresses to said higher speed memory means in response to subsequent assertion of access addresses to said higher speed memory means within a predetermined address range of the most recently loaded instruction to provide an expanding cache of instructions.

10. In a memory system including a first memory means, a higher speed memory means for receiving a series of instructions from said first memory means in plural regions of said higher speed memory means for storage and retrieval in response to program source addresses, wherein said program source addresses identify addressed locations in either memory means, means for individually loading said regions of said higher speed memory means with different first instructions from said first memory means in response to assertion of different first program source addresses, and means for bringing about loading of further instructions into said regions of said higher speed memory means from said first memory means at consecutive addresses beyond said different first program source addresses and desirably beyond subsequent access addresses to said regions in response to the presence of subsequent accesses to said regions within a predetermined address range of the addresses of the most recently loaded instructions to provide an expanding cache of instructions at different groups of addresses.

11. The memory system according to claim 10 including means for determining the least recently used region for access purposes, and means for bringing about reloading of said least recently used region starting with information indentified by a newly asserted program source address when no region contains information identified for retrieval within a given range of the newly asserted program source address.

12. In a memory system including a first memory, a higher speed memory means for receiving a series of instructions from said first memroy for storage and faster retrieval in response to a program source address, said higher speed memroy means receiving instructions for storage at addresses in said higher speed memory means normally between a base address and a top address, wherein individual addresses in said higher speed memory means correspond generally to addresses of at least a portion of said first memory, means for providing a fetch address higher in numerical value than said top address for accessing information from said first memory for storage in said higher speed memory means at said top address while increasing said top address, and means for incrementing said fetch address and providing further fetching therewith for said accessing of said information for expanding the series of instructions stored in said higher speed memory means in response to access of the higher speed memory means by said program source address.

13. The memory system according to claim 12 wherein said means for incrementing includes means responsive to assertion of a said program source address within a predetermined proximity of said top address.

14. The memory system according to claim 12 including means for initially setting said base address, said top address and said fetch address to an initial program source address, followed by said incrementing said fetch address to a higher value for accessing information from said first memory for expanding the series of instructions.

15. The memory system according to claim 12 including means for rapidly invalidating said higher speed memory means for receiving new instructions, said invalidating means comprising means for setting said base address and top address to a new program source address.

16. The memory system according to claim 15 wherein said invalidating means also includes means for setting said fetch address to said new program source address.

17. The memory system according to claim 12 including means delaying access of instructions from said higher speed memory means when a newly asserted program source address is higher numerically than said top address within a predetermined range until said fetch address accesses sufficient information from said first memory to increase said top address to the value of said program source address.

18. The memory system according to claim 17 including means for reloading said higher speed memory means starting with a newly asserted program source address when a newly asserted program source address is not within said predetermined range of the top address.

19. In a memory system including a main data memory,
an instruction cache having a higher operating speed than said main data memory, said cache including a plurality of random access memories, said memories having addresses for instruction locations,
a plurality of registers associated with each random access memory including a first register for storing a base pointer indicative of a base address in said random access memory as well as in said main data memory, a second register for storing a top pointer indicative of a top address in said random access memory as well as in said main data memory, with a series of instructions normally being stored in said random access memory between said base address and said top address, and means for indicating a fetch pointer normally higher in numerical value than said top pointer,
means responsive to said fetch pointer for accessing instructions from said main data memory for storage in a said random access memory at the top pointer address thereof and for thereupon incrementally increasing said top pointer address,
means for accessing instructions from a said random access memory in response to an asserted program source source address,
and means for incrementally increasing the numerical value of a said fetch pointer to access further instructions from said main data memory for storage in the said random access memory as said asserted program source address approaches said top pointer of the corresponding random access memory for the purpose of filling said random access memory in advance of access by said program source address to provide an expanding segment of instructions in the said random access memory between its base pointer and top pointer.

20. The memory system according to claim 19 including means for delaying access of instructions from said instruction cache when the asserted program source address is within predetermined range beyond addresses identifying instructions in a given random access memory until the fetch pointer for that random access memory is increased to access sufficient information from said main data memory to increase the value of the top address for said random access memory to the value of the program source address.

21. The memory system according to claim 19 wherein said random access memories are individually responsive to said program source address when the store instructions including an instruction identified by the program source address,
the apparatus further including means for logically determining the least recently used random access memory for access purposes,
and means for bringing about loading of said least recently used random access memory from said main data memory when no random access memory stores an instruction within a given range of the said program source address.

22. The apparatus according to claim 21 including means for setting the first register and the second register associated with the least recently used random access memory to said program source address when no random access memory initially stores an instruction identified within a given range of the said program source address.

23. The memory system according to claim 19 including means for initially setting the first register and the second register associated with a random access memory to an initial program source address, said fetch pointer being increased to a higher value for filling said random access memory at the address of the top pointer in the second register.

24. The memory system according to claim 19 wherein said means for accessing instructions comprises plural means for simultaneously comparing the program source address with addresses corresponding to instructions stored within each of said random access memories, means for concurrently accessing instructions from each of said random access memories in correspondence to a group of least significant bits of said addresses, and means for outputting an instruction from one of said random access memories as selected by said plural means for simultaneously comparing.

25. In a memory system including a first memory,
a higher speed memory means for receiving a series of instructions from said first memory for storage and faster retrieval of instructions in response to an asserted program source address,
said higher speed memory means including a plurality of sections each for receiving and providing said instructions between a base address for a section and a top address for the section, said instructions being provided as an output in response to said asserted program source address, and means for supplying a fetch address for the section which address is normally higher in numerical value than said top address, said fetch address being employed for accessing information from said first memory for storage in a said section, wherein individual addresses of said higher speed memory means correspond generally to addresses of at least a portion of said first memory,
means for incrementing the fetch address for a section to access further information from said first memory for storage in said section to expand the series of instructions stored in said section in response to access of said section by said program source address, said expansion being in preference to sections not accessed by said program source address, means for determining the section least recently used in providing instructions as an output, and means for loading said least recently used section from said memory when no section stores an instruction identified within a given range of said asserted program source address.

26. The memory system according to claim 25 including means for setting the base address and the top address for a least recently used section to said program source address when no section initially stores an instruction identified by an asserted program source address and the asserted program source address is not within a predetermined range beyond addresses identifying instructions stored in said sections.

27. The memory system according to claim 26 including means for delaying access of instructions from said higher speed memory means when the asserted program source address is within predetermined range beyond addresses identifying instructions in a given section until the fetch address for that section is incremented to access sufficient information from said first memory to increase the value of the top address for said section to the value of the program source address.

28. In a memory system including a first memory, a higher speed memory means for receiving a series of instructions from said first memory for storage and faster retrieval in response to a program source address, wherein individual addresses in said higher speed memory means correspond generally to addresses of at least a portion of said first memory, means providing a fetch address incrementally higher in numerical value than addresses of instructions currently in said higher speed memory means for accessing further instructions from said first memory for storage in said higher speed memory means, and means for incrementing said fetch address and providing further fetching therewith for said accessing of said instructions for expanding the series of instructions stored in said higher speed memory means in advance of access therefor in said higher speed memory means by a program source address.

* * * * *